May 12, 1959  E. G. SIMMONS  2,886,134
LUBRICATING APPARATUS
Filed March 14, 1956  4 Sheets-Sheet 1

INVENTOR
Edward George Simmons
ATTORNEY

May 12, 1959  E. G. SIMMONS  2,886,134
LUBRICATING APPARATUS
Filed March 14, 1956  4 Sheets-Sheet 2

INVENTOR
Edward George Simmons
BY
ATTORNEY

May 12, 1959 E. G. SIMMONS 2,886,134
LUBRICATING APPARATUS
Filed March 14, 1956 4 Sheets-Sheet 3
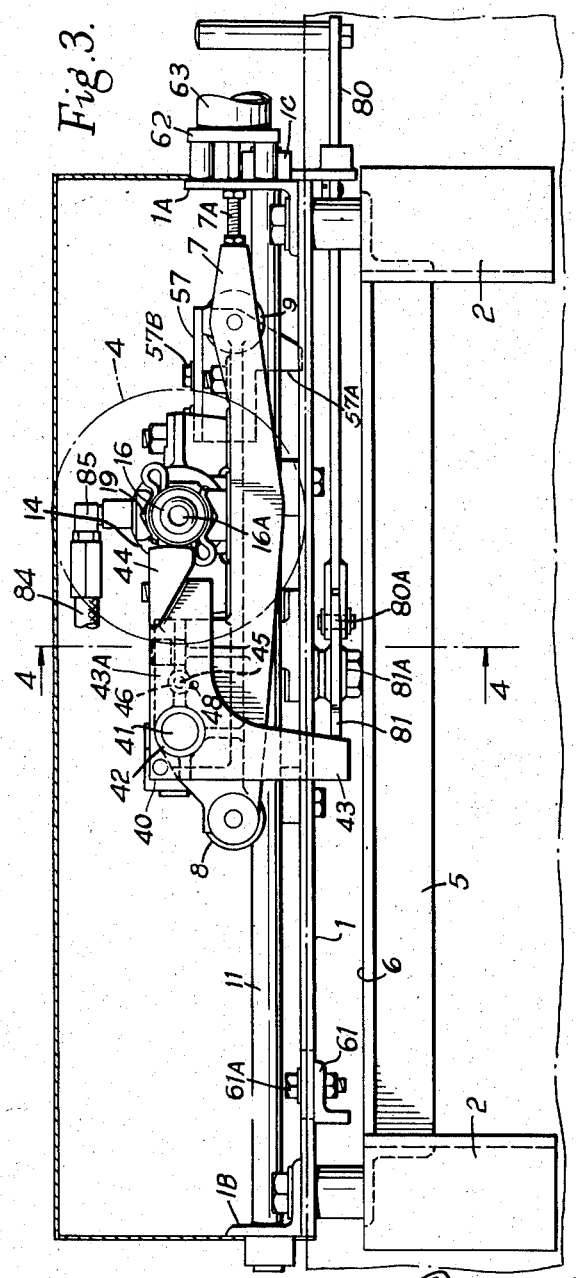
INVENTOR May 12, 1959   E. G. SIMMONS   2,886,134
LUBRICATING APPARATUS
Filed March 14, 1956   4 Sheets-Sheet 4
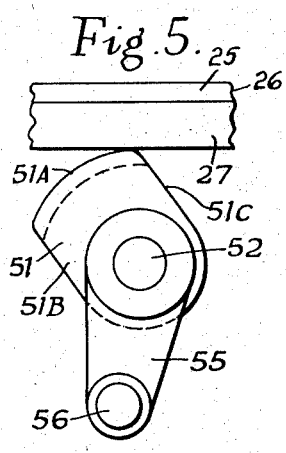
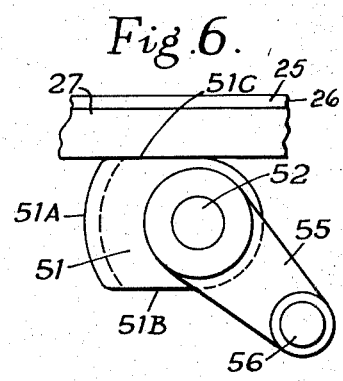
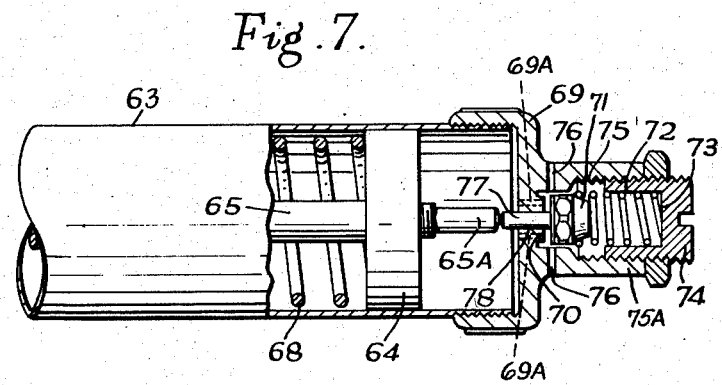

United States Patent Office 2,886,134
Patented May 12, 1959

---

2,886,134

LUBRICATING APPARATUS

Edward George Simmons, Plymouth, England, assignor to Tecalemit Limited, Brentford, England Application March 14, 1956, Serial No. 571,491

Claims priority, application Great Britain March 16, 1955

13 Claims. (Cl. 184—15)

This invention provides improved apparatus of the kind used for dispensing lubricant to the wheels or rollers of chain conveyors and to the wheels of rolling stock, such as railway wagons or trucks, colliery and other trucks and so-on. For simplicity of description, chain conveyors and all types of rolling stock to which this invention is applicable will hereinafter be termed "conveyors" or "chain conveyors" according to the context and the wheels or rollers will be referred to as "rollers."

A chain conveyor usually comprises two parallel endless chains joined by transverse spindles at convenient intervals, which spindles carry guiding or supporting rollers or wheels. In certain conveyors at intervals, usually at every second or third spindle, a container is suspended from or is attached to a spindle for carrying the material to be conveyed.

In certain known apparatus of the above mentioned kind, it has been usual to provide an endless satellite chain at one side of the main conveyor, the rollers of which conveyor are to be lubricated. The satellite chain carries a number of spaced lubricant guns and moves in timed relationship with the main conveyor and it has means associated with it to make contact with, and to convey lubricant to, the spindles of the main conveyor. The correct functioning of apparatus of this kind depends upon a correct relationship being maintained between the pitch of the lubricant guns mounted on the satellite chain and the pitch of the spindles of the main conveyor, and the establishment of this relationship is frequently the cause of much experiment and expense.

One object of the present invention is to provide lubricant-dispensing apparatus, the operation of which is independent of the pitch of the spindles in the conveyor chain to be lubricated, the apparatus therefore being of such a nature that it can be universally applied without being subject to the disadvantages of the known lubricant-dispensing apparatus referred to above.

The present invention therefore provides a lubricant-dispensing apparatus of the kind referred to, comprising a support or base; a carriage reciprocably mounted on the support; driven means on the carriage which, when engaged by driving means on the conveyor chain, causes the carriage to be advanced from an initial or re-set position through a predetermined path in the direction of movement of the chain; a lubricant dispensing device mounted upon the carriage and from which the lubricant is discharged under pressure into the spindles of the rollers of the moving chain through means on the dispensing device and cooperating means on; or associated with, the spindles, an abutment on the support which is movable from an operative or re-set position into an inoperative position and vice versa and is arranged adjacent to the carriage and, which, when in its operative position, acts to actuate the lubricant-dispensing device while the carriage is being advanced by, and in the same direction as, the conveyor chain, and thus to cause the lubricant-dispensing device to discharge lubricant into the roller spindle with which the device is then engaged; actuating means on the support which, in association with means on the carriage and during the advancement of the carriage, acts to bring the said abutment into an inoperative position when the lubricant dispensing device has completed its discharge of lubricant into the roller spindle, the said actuating means, in association with other means on the carriage, also acting to bring the said abutment into its operative position while the carriage is returning to its initial or re-set position; means for returning the carriage into its initial or re-set position after the driven means has been disengaged from the driving means; and means for returning the driven means into its operative position before the carriage reaches its initial or re-set position.

The lubricant-dispensing device preferably consists of a lubricant gun or pump which is arranged on the carriage transversely to the conveyor chain and includes a reciprocable plunger or piston which is slidable in a cylinder or barrel and which draws lubricant into the cylinder or barrel on its suction stroke and discharges the lubricant from the latter on its discharge stroke, the plunger or piston being adapted to cooperate with the said abutment on the advancement of the carriage with the conveyor chain so as to cause the discharge of lubricant from the cylinder or barrel.

The said driving means on the conveyor chain may consist of the spindles of the rollers or of abutments associated with the spindles.

A constructional form of the invention is fully described hereinafter wherein the lubricant is discharged from the cylinder or barrel through a nozzle which is held in lubricant-tight engagement with a lubricant-receiving device on a roller spindle during the time when the carrier is being advanced by the conveyor chain.

The said driven means on the carriage consists of a trip lever which is pivotally mounted on the carriage and is adapted to be engaged by a roller spindle, or by an abutment associated with the latter, to cause the carriage to travel from its initial or re-set position. Means are provided on the support for disengaging the trip lever after the lubricant-dispensing device has completed its discharge of lubricant into the roller spindle.

Means are provided on the carriage for retaining the trip lever in its disengaged position while the carriage is returning to its initial or re-set position and means are provided on the support for causing the trip lever to return to the position in which it can again be engaged by a roller spindle or by an abutment associated with the latter.

The means for causing the trip lever to return to the position in which it can again be engaged by a roller spindle, or by an abutment associated with the latter, consists of a control member which can be operated manually to stop and restart the delivery of lubricant from the lubricant gun or pump.

In the same construction, the plunger or piston of the lubricant gun or pump is caused to carry out its discharge stroke during the advancement of the carriage by the conveyor chain by means of a movable control member which is pivotally mounted upon the support and is raised into its inoperative position, after the lubricant gun or pump has carried out its discharge stroke by an abutment arranged on the carriage and cooperating with means on the support which is adapted to raise and lower the control member, the control member being lowered into its operative position after the carriage has commenced to move back to its initial or re-set position by a second abutment arranged on the carriage and spaced longitudinally from the first mentioned abutment. The said control member consists of a cam plate having a rearwardly-sloping face which is inclined to the direction of movement of the carriage and with which the plunger or piston is adapted to engage while the carriage is being advanced from its initial or re-set position by the conveyor chain. The cam plate is raised and lowered by means of a cam which is turnably arranged on the support and is actuated alternately and in opposite directions by two abutments arranged on the carriage on opposite sides of the lubricant pump or gun. The cam plate is adjustable towards and away from the longitudinal axis of the carriage, this arrangement permitting the pumping capacity of the lubricant pump or gun to be varied as required.

The return travel of the carriage to its initial or re-set position may be carried out by the action of at least one spring or weight. In the construction briefly described above in which a spring is used, the spring forms part of means for dampening the movement of the carriage when the latter is returning to its initial or re-set position, the, or each, spring being enclosed in a casing and acting upon a piston therein coupled to the carriage, the casing being provided with air-relief means which acts to permit the escape to atmosphere of air compressed in the casing when the carriage has almost completed its return movement into its initial or re-set position.

One constructional form of the invention, applied to the lubrication of the rollers of a chain conveyor, is shown, by way of example, in the accompanying drawings, wherein:

Figure 3 is an end elevation of the apparatus;

Figure 5 is an end view of the actuating mechanism which, under the control of the movement of the carriage, acts to bring the cam plate, which is used to operate the lubricant-dispensing gun, into its operative and inoperative positions, the figure showing the actuating mechanism in the positions in which it is moving and has moved the cam plate into its inoperative position;

Figure 1:
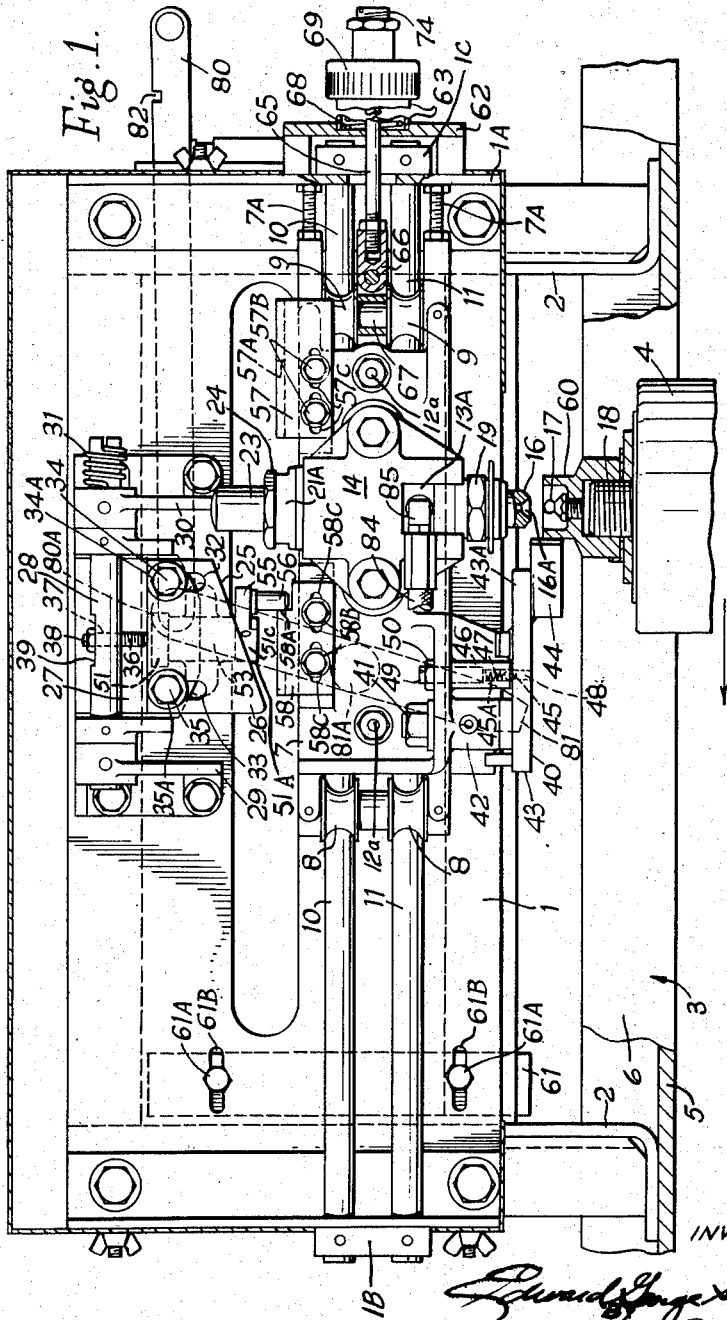
Figure 1 is a plan view of the lubricant-dispensing apparatus, partly in section.

Figure 6 is a view corresponding to Figure 5 but shows the actuating mechanism in the position in which it has allowed the cam plate to move into its operative position; and Figure 7 is a fragmentary sectional view of the dashpot associated with the carriage and shows the air relief valve of the dashpot in its opened position, the carriage then being in its original or re-set position in which it has been retracted from the cam plate which acts to operate the lubricant-dispensing gun.

Referring to the drawings:

This constructional form of the invention comprises a horizontal platform or base 1 which is carried by means of transverse mounting backets 2 secured to one side of the frame 3 of the conveyor of which the rollers 4 are to be lubricated. The frame 3 comprising two spaced side supports 5 (only one being shown in Figures 1 and 4) having flanges 6 upon which the rollers of the conveyor are mounted. The longitudinal axis of the base 1 is parallel to, and the base is spaced from, the adjacent side of the conveyor frame 3.

A carriage 7 is arranged for slidable reciprocating movement on one side of the conveyor by means of two pairs of rollers, Figure 1, one pair 8—8 being journalled in and at one end of the carriage and the other pair 9—9 being journalled in and at the opposite end of the carriage. The rollers run upon two transversely spaced guide bars 10 and 11 which extend longitudinally of the base 1 parallel to the axis of the latter and are secured to the ends of the base as at 1B and 1C, respectively. In order to take up the side thrust on the carriage, the latter is provided with another pair of rollers 12, Figures 1, 2 and 4, which are arranged on axes 12a at substantially right angles to the axes of the rollers 8 and 9 and mounted in longitudinal-spaced relationship on and below the carriage and which engage between the two guide bars 10 and 11.

While any convenient type of plunger-operated lubricating gun may be used it has been found convenient to use a lubricating gun of the type described in British patent specification No. 623,180 and corresponding United States Patent No. 2,594,039, and which is fixed on the carriage 7 with its axis arranged transversely of the latter.

Figure 2:
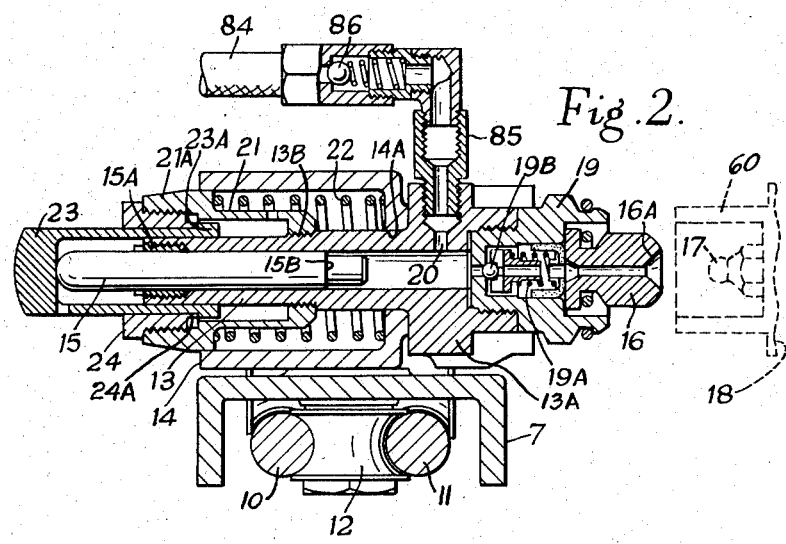
Figure 2 is a sectional elevation of the lubricant-dispensing gun.

Referring to Figure 2, the gun or dispensing device, per se, comprises a barrel 13 slidably arranged in an outer sleeve-like housing 14 to project beyond the ends of the housing, the housing being fixed on the carriage 7. The forward end of the barrel 13 slidably extends through a central opening 14A in a forward end wall of the housing 14 and is enlarged to form a head 13A which limits the rearward movement of the barrel in said housing and which is internally threaded to receive and retain a plug-like body 19 having a passage therethrough communicating with the bore of the barrel and containing a spring-loaded check valve 19B. The body member 19 carries a dispensing nozzle 16 at its outer or forward end (shown also in Figure 1) adapted to cooperate, and form a lubricant-tight seal, with the nipples 17 on the spindles 18 on the rollers 4 of the conveyor chain as the rollers pass the apparatus on the flange or rail 6.

The open rear end of the housing 14 is closed by a guide sleeve 21 surrounding the rear portion of the barrel 13 in spaced relation thereto, the forward end of the sleeve 21 having its forward end secured to an intermediate portion of the barrel, as at 13B, and its rear end being offset radially outwardly to provide a larger diameter to fittedly and slidably engage the interior diameter of the outer housing 14. A helical compression spring 22 is disposed within the outer housing 14 and has one end bearing upon the apertured forward wall thereof and its other end upon a shoulder formed by the enlarged rear-end portion 21A of the guide sleeve 21 and thus biases the barrel toward the limit of its rearward sliding movement in the housing 14. An ejector plunger 15 is slidably disposed in the bore of the barrel 13 and is of such a length that its rear end projects outwardly of the barrel through a gland means 15A which prevents leakage of the lubricant between the plunger 15 and the barrel 13. A cam-follower in the form of a thimble-like cap 23 closes the rear end of the barrel 13 and into which the rear end of the plunger extends and is contacted by the closed end of the thimble to move the plunger in its lubricant-ejecting movement. The open end of the thimble-cap is slidably fitted between the barrel 13 and the sleeve 21 and a threaded ferrule 24 surrounds the thimble 23 and is screwed into the internally threaded open rear end 21A of the guide sleeve 21. The leading end 24A of the ferrule cooperates with a stop-shoulder 23A of the open end of the thimble to prevent the thimble from falling out of position on the guide sleeve or being forced out of position by the action of the rear end of the plunger 15 engaging the closed end of the thimble.

It will be noted that the forward end of the plunger is reduced to provide a nose end of less diameter than the major portion thereof and to provide a shoulder 15B, the function of which will appear later in this description.

The check-valve 19B may be in the form of a ball biased to its seat by a spiral compression spring 19A to prevent the return of the lubricant discharged therethrough and to act as a cut-off valve, when the ejecting operation of the plunger is discontinued, for preventing discharge of lubricant from the barrel. The nozzle 16 has an orifice 16A to mate with the nipple 17.

The bore of the barrel 13 is supplied with a charge of lubricant, under pressure, through an inlet port 20 disposed between the check-valve 19B and the forward end of the ejector plunger 15, when in its retracted position, this area of the bore acting as a measuring chamber from which a substantially apportioned charge of lubricant is discharged by the ejector plunger, after the nozzle orifice 16A has been moved into engagement with its mating nipple 17 and when the plunger 15 is in its lubricant discharging stroke. When the spring 22 returns the barrel 13 rearwardly to its initial or reset position, the closed end of the thimble 23 is spaced from the rear end of the plunger, whereupon the pressure of the lubricant in the tube 84—85 will act on the shoulder 15B and return the plunger 15 to its reset position shown in Figure 2.

Referring also to Figure 1, when the rear end of the thimble 23 contacts with a sloping cam face 25 on a cam plate 26 (referred to hereinafter), the thimble 23 and the plunger 15 are both thrust forward towards the discharge end of the bore of the barrel 13. Assuming that the pump chamber in the barrel is filled with lubricant, the forward pressure on the plunger due to the engagement of the cam face 25 and the thimble 23 would normally cause the lubricant to be discharged past the non-return discharge valve 19 and out of the gun nozzle. The non-return valve, however, is held on its seal by a spring 19A to a pressure considerably higher than that represented by the force of the coil spring 22 acting upon the guide sleeve 21 divided by the plunger area. Thus, as the pressure builds up in the bore of the barrel 13 the coil spring 22 begins to collapse before the discharge valve 19B opens and therefore the thimble 23, the plunger 15, the barrel 13 and the guide sleeve 21 move forward in unison. In these circumstances, lubricant is not discharged past the discharge non-return valve 19B. In due course, however, the nozzle orifice 16A contacts a nipple 17 on one of the conveyor spindles, whereupon its further forward movement is stopped while the further forward movement of the plunger 15, caused by the engagement of the thimble with the said sloping cam face 25, causes lubricant to be discharged from the bore of the barrel 13 past the non-return valve 19B and thus out of the nozzle into the nipple. The gun or dispenser is mounted upon the carriage 7 with its axis at right angles to the guide bars 10 and 11 and thus at right angles to the direction of movement of the conveyor rollers shown by the arrow in Figure 1.

Figure 4:
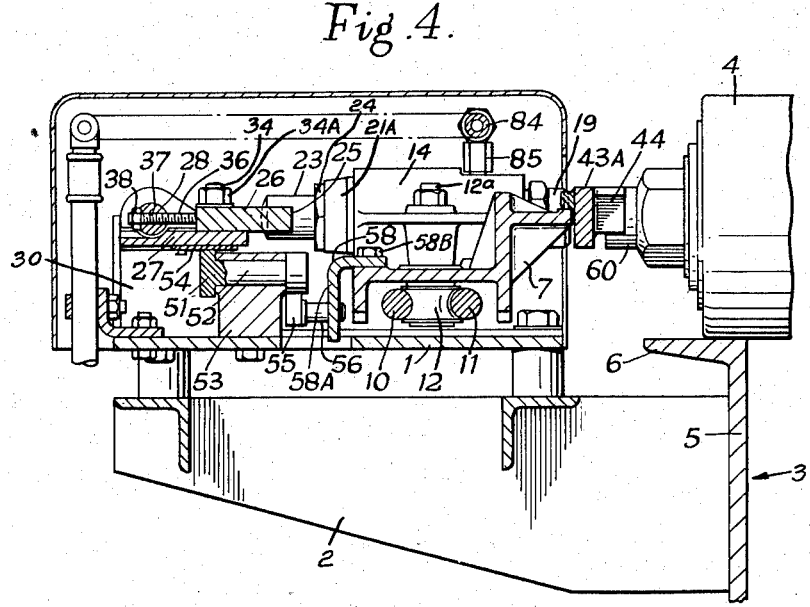
Figure 4 is a section on the line 4—4 in Figure 3.

The operation of the lubricating gun is controlled by means of the cam plate 26, Figures 1 and 4, which is adjustably mounted on a cam plate support 27 pivoted on a shaft 28 which is parallel to the longitudinal axis of the carriage and is turnably mounted in brackets 29 and 30 fixed to the base 1 on the side of the axis of the carriage opposite to that side of the carriage which is adjacent to the conveyor. The shaft 28 is acted upon by a torsion spring 31, Figure 1, which is arranged at one end of the shaft and is adapted to return the cam plate support 27 and cam plate 26 from an upper rest or inoperative position into a lower or operative position, particulars of which will be described hereinafter. The cam face 25 of the cam plate 26 which is adjacent to the carriage is sloped forwardly (i.e. in the direction of movement of the conveyor) from a rear position spaced at a certain distance from the said axis. The cam plate is formed with two longitudinally-spaced elongated slots 32 and 33 through which project the shanks of two studs 34 and 35 carried by the cam plate support 27. Thus, the cam plate can be adjusted on its support plate towards and away from the axis of the carriage and it can be fixed in its adjusted positions by means of nuts 34A and 35A which are threaded on the studs and engage washers on the top face of the cam plate. In order to adjust the cam plate, use is made of an adjusting screw 36 which is engaged in a threaded hole 37 extending transversely through the shaft 28 and which can be fixed in its adjusted positions by means of a lock nut 38 which bears on the bottom of a longitudinal recess 39 formed in the shaft, the inner end of the screw engaging the outer or rear face of the cam plate 26.

An angular trip lever 40, Figures 1 and 3, is arranged for limited turnable movement on a horizontal shaft 41 journalled in a bearing on a boss 42 formed on the side of the carriage which is adjacent to the conveyor. The vertical arm 43 of the lever normally hangs downwards and the free end of the horizontal arm 43A of the lever is provided with a wearing block 44 the purpose of which will be described hereinafter. The angular motion of the arm 43 is limited to 15°. In order to fix the trip lever in an inoperative position a ball 45, Figure 1, which is mounted at the outer end of a hole 45A in a transverse boss 46 on the carriage and which is acted upon by a spring 47, is adapted to engage in a hole 48 formed in the face of the horizontal arm of the trip arm adjacent to the carriage. The pressure of the spring 47 acting on the ball 45 can be adjusted by means of a screw 49 which is threaded into the threaded inner end of the hole 45A and can be locked by means of a lock nut 50.

The cam plate 26 and its support 27 are arranged to be swung upwards and downwards by means of the cammed or eccentric head 51 of a cam shaft 52, see particularly Figures 1, 4, 5 and 6, oscillates in a bearing provided in a saddle 53 secured to the base 1, the axis of the shaft being arranged at right angles to the path of movement of the carriage. The cammed or eccentric head 51 is formed with a curved peripheral surface 51A, Figures 5 and 6, and with two flat sides 51B and 51C and according to the setting of the cam shaft the peripheral surface or one of the flat sides are arranged to engage a wearing plate 54 which is fixed beneath the bottom surface of the cam plate support 27. A lever 55 is fixed at the end of the shaft opposite to the cammed or eccentric head and is provided with a stop pin 56 which is parallel to the axis of the shaft 52 and projects in a direction towards the carriage, see also Figure 1. When the carriage is moved in the direction of movement of the conveyor, the stop pin 56 is engaged by a vertical arm 57A on rear angular trip plate 57 mounted for adjustment on the carriage longitudinally of its movement and is disposed at one side of the lubricating gun (see Figures 1 and 3). When the carriage is moving in the other direction, i.e. to the right in Figures 1 and 3 towards its initial or re-set position however, the said stop pin 56 is engaged by a vertical arm 58A on front angular trip plate 58 similar to the stop plate 57 and also mounted for adjustment on the carriage longitudinally of its movement and is disposed at the other side of the lubricating gun. When the vertical arm 57A or 58A of the trip plate 57 or 58 strikes, the stop pin 56 the cam shaft 52 is rotated to cause the cam plate 26 to pivot upwards or downwards, as the case may be, in the reciprocal movement of the carriage 7. In the case of the plate 57 longitudinal adjustment is provided for by bolts 57B screwed into the carriage and passing through elongated slots 57C in the plate and in the case of the plate 58 by bolts 58B passing through slots 58C in the slot.

As mentioned above, each of the roller spindles on the conveyor chain is provided with a lubricant-receiving nipple 17 which is arranged within a protecting shroud or cap 60. When the conveyor chain is in motion the shroud moves into contact with the wearing block 44, Figures 1 and 3, on the horizontal arm 43A of the trip lever 40 and thus moves the carriage in the direction of movement of the chain. As the carriage moves in unison with the chain the thimble 23 on the protruding end of the plunger 15 of the lubricating gun contacts the sloping face 25 of the cam plate 26, which latter is then in its lowered or re-set position with the cam plate support 27 resting upon flat side 51C of the head 51 of the cam shaft 52 as shown in Figure 6. The barrel 13 and the plunger 15 of the lubricating gun are forced inwards until first the discharge nozzle 16 of the gun is brought into engagement with the nipple 17 within the shroud 60 on the conveyor spindle 18 and then, as the plunger is urged still further inward, a predetermined quantity of lubricant is discharged into the nipple.

When the thimble 23 on the gun plunger 15 has travelled past the sloping edge 25 of the cam plate 26 the vertical arm 57A on the rear trip plate 57 comes into contact with the said pin 56 on the lever 55 fixed to the cam shaft 52, which latter is rotated from the position shown in Figure 6 to the position shown in Figure 5, and the cam plate 26 is lifted upwards clear of the thimble on the gun plunger due to the curved peripheral surface 51A of the cam shaft head 51 fully engaging beneath the cam plate support 27. During this operation and while the carriage advances with the chain, the vertical arm 43 of the trip lever 40 is brought into contact with a transverse stop plate 61 which is arranged near that end of the base towards which the carriage is moving and is adjustable longitudinally by means of bolts 61A screwed into the base and passing through elongated slots 61B in the stop plate. This adjustment is necessary as the trip lever 40 must come into contact with the stop-plate 61 within the distance permitted by the oscillatory movement of the pin 56. When so tripped by the stop-plate 61, the trip lever 40 is thus turned counter clock-wise about its pivot 41 and the wearing block 44 on the horizontal arm 43 of the lever is lifted above, and is disengaged from contact with, the shroud or cap 60 of the nipple, the spring-urged ball 45 then engaging in the hole 48 in the horizontal arm of the trip lever. The carriage is then returned to its original position by spring-loaded dash-pot means 63 with the wearing block 44 and the cam-plate means 26—27 still in the raised position and is re-set for a further operation in the following manner.

A tubular dash pot casing 63, Figures 1 and 7, has an end plate 62 fixed at the end 1A of the base 1 adjacent to the carriage, when the latter is in its initial or re-set position, the axis of the casing being in line with the axis of the carriage and has a piston 64 slidably mounted therein. A piston rod 65 extends from the piston and has its free end coupled by a universal joint 66 to a transverse shaft 67 mounted on the carriage. A helical compression spring 68 is arranged in the casing and acts between the end plate 62 of the casing and the piston and tends to thrust the piston outwards of the casing and thus to move the carriage into its re-set position. The piston 64 comprises a leathercup assembly and air is thus able to leak past the piston during the forward travel of the piston. The opposite end of the dash pot casing is closed by a cap 69 having passage 69A therethrough communicating the interior of the casing with a valve seat 70 on the outer face of the cap 69, Figure 7, and which seat is adapted to be closed by a relief valve 71 disposed within a tubular boss or extension 75 projecting outwardly from the cap. The valve 71 is normally urged on to its seat 70 by a spring 72 reacting between the valve and the end of a cylindrical recess 73 in an adjusting plug 74 which is screwed into the threaded bore 75A of a hollow boss 75. The hollow boss 75 is formed with air-relief ports 76 through which air from the interior of the casing 63 is vented to the atmosphere when the valve 71 is opening, these ports 76 being closed by the relief valve 71 when the latter is seated. To this end, the piston rod 65 is provided with a coaxial projection 65A which, towards the end of the movement of the carriage into its re-set position, presses against a plunger 77 which is slidably arranged in a hole 78 in the end cap 69 and the other end of which is integral with the relief valve. When the carriage has moved away from its re-set position, the projection 65A on the piston rod 65 disengages the plunger 77 and the relief valve is re-seated under the action of the spring 72. The plug 74 is adapted to adjust the loading on the spring 72 and regardless of any manual adjustment by means of the plug, the piston is positively adjusted at the end of its stroke and always returns to its original position thus damping the action of the carriage.

When the carriage is nearing its initial or re-set position, the said front trip plate 58, Figures 1 and 4, engages the pin 56 on the cam 51 operating lever 55 and the cam is turned in the opposite direction (i.e., from the position shown in Figure 5 to the position shown in Figure 6) and allows the cam plate 26 to return into its original or re-set position, in which the cam plate support 27 again rests upon the flat side 51C of the head 51 of the cam shaft 52 as shown in Figure 6.

The delivery of lubricant may be stopped and restarted at will by means of a control lever 80, Figures 1 and 3, which is slidably mounted under the base and is pivotally attached at 80A at its inner end to an arm 81 pivoted at 81A to and under the base. The lever 80 can be disengaged from its normal operative position and slid inwards so that a slot 82 in the lever is engaged by an abutment on the base, whereupon the arm 81 attached to the lever is moved out of the path of the vertical arm 43 of the said pivoted trip lever 40 on the carriage and allows the trip lever to remain in its raised position where it is held by the spring-loaded ball 48 referred to above and in which the said wearing block 44 on the horizontal arm 43 of the trip lever is held out of the path of the said shrouds or caps 60 surrounding the nipples. The discharge of lubricant may be started again by re-engaging the control lever 80 in its operative position referred to above, in which position, on the return of the carriage into its original or re-set position the vertical arm of the said trip lever 40 strikes the said pivoted arm 81 attached to the control lever and the trip lever is returned into its re-set or operative position ready for a fresh operation.

The amount of lubricant discharged from the gun may be adjusted by loosening the nuts 34A and 35A on the studs 34 and 35 which hold the cam plate 26 in position on the cam plate support 27 and by adjusting the cam plate towards or away from the longitudinal axis of the carriage, the cam plate being adjusted by means of the above mentioned adjustable set screw 37 which is mounted in the shaft 28 with which the cam plate is turnable. The sloping edge 25 of the cam plate can thus be moved transversely towards and away from the thimble 23 on the plunger 15 of the lubricating gun so as to increase or decrease the quantity of lubricant discharged per stroke of the plunger. The adjustment screw 37 is screwed inwards so as to abut against the adjacent edge of the cam plate and after the required adjustment of the cam plate has made the nuts 34A and 35A which hold the cam plate on the cam plate support are securely locked and the locknut 38 on the set screw is tightened.

The apparatus includes a separate high pressure lubricant pump unit (not shown) which operates under constant pressure and which feeds the lubricant to the lubricating gun when the latter is not in operation, and when the carriage is carrying out its return movement, through a flexible pipe line 84 which is connected to the high pressure pump unit at one end and at its opposite end through an elbow 85 which has a spring-urged non-return valve 85, Figure 2, is connected to the inlet port 20 of the lubricating gun. As shown in Figures 1 and 3, the carriage may be provided with adjustable headed buffer screws 7A which, while the carriage is moving towards its re-set position, by abutment against the end wall 1A of the base prevent further movement of the carriage in its re-setting travel. This adjustment is co-ordinated with the extent of the oscillating movement of the pin 56, as the travel of the carriage 7 to its reset position is limited by the pin 56, as shown more particularly in Figure 1.

The apparatus is capable of dispensing oil or grease and it may of course be arranged vertically or horizontally or at an angle to the horizontal.

I claim:

1. An automatic lubricating apparatus comprising a lubricant dispensing device mounted for guided reciprocal movement and adapted to be positioned to be engaged by an object moving in a direction of movement of said dispensing device, whereby said device may be advanced by and with said object; means for moving said dispensing device in its other direction to a reset position; said dispensing device including a part mounted for a to-and-fro movement relative to a lubricating position with respect to a part of said object to be lubricated and biased normally to assume a non-lubricating position; cam-means mounted for movement into and out of the path of movement of said shiftable part and normally disposed in the path of movement of said part during the advancing movement of said dispensing device to shift said part against its bias into lubricating position; spaced abutment-means carried by said dispensing device, one of said abutments being positioned to move said cam-means out of the path of movement of said shiftable part, after effecting its camming operation, to render said cam-means ineffective during the return movement of the dispensing device to reset position; means for releasing said dispensing device from said object after said camming operation, and the other of said abutment-means being positioned to move the cam-means into the path of movement of said shiftable part, after the latter has passed said cam-means, in the return movement of said dispensing device to its reset position.

2. An apparatus as claimed in claim 1 wherein said releasing means comprises a trip-lever pivotally mounted on the dispensing device and positioned to be engaged by an abutment on said moving object to cause the dispensing device to travel from its initial reset position, said trip-lever being positioned relative to said dispensing device to align it with the part, to be lubricated, on said moving object; and wherein there is means for tripping said lever positioned at a point in the advancing movement of said dispensing device after said camming operation of said cam-means.

3. An apparatus as claimed in claim 2, wherein means are provided on the dispensing device for retaining the trip lever in its tripped position while the dispensing device is returning to its initial reset position; and wherein means are provided for moving the trip lever for re-setting said lever during the return movement of said dispensing device to the position in which it can again be engaged by another abutment on the same or another moving object.

4. An apparatus as described in claim 3, wherein the said means for resetting said trip lever includes an adjustable control member operable manually to set said trip lever for automatic operation and to allow the lever to remain tripped and to reset said trip lever, whereby the delivery of the lubricant may be manually controlled from said dispensing device.

5. An apparatus as claimed in claim 1, wherein the said cam-means includes a cam-plate having a face converging in the direction of the advancing movement of the dispensing device by said object and with which said shiftable part is adapted to engage while the dispensing device is being advanced from its initial reset position by said moving object.

6. An apparatus as claimed in claim 1, wherein the cam-means includes an oscillatable member actuated alternately and in opposite directions by said spaced abutments, and wherein said spaced abutment means are arranged on said dispensing device on opposite sides of said shiftable part.

7. An apparatus as claimed in claim 1, wherein the cam means is adjustable towards and away from the path of movement of the dispensing device for varying the amount of lubricant discharged from the fitting of said dispensing device.

8. An apparatus as claimed in claim 1, wherein the means for returning the dispensing device to its initial reset position is a fixedly mounted spring-loaded dash-pot connected to said dispensing device for damping the return movement of the dispensing device and provided with a pressure-responsive air-relief means positioned to permit the escape to atmosphere of air compressed in the dash-pot means, when the dispensing device has almost completed its return movement into its initial reset position.

9. An apparatus as claimed in claim 8, wherein the said relief means consists of a relief valve normally held upon a seat by a spring, and wherein means are provided for varying the loading on the spring.

10. In an apparatus for dispensing lubricant, a housing mounted for reciprocal movement and including a part movable therewith and adapted to be positioned to be engaged by a moving object to advance the housing in one direction, biasing means connected to the housing to return the housing to a reset position in the other direction of its movement, a dispensing means mounted within the housing for reciprocal movement into and out of lubricating position and substantially transverse to the movement of the housing, means for biasing the dispensing means in one direction of its movement to withdraw it from lubricating position, a cam means arranged along the path of movement of the housing and positioned to engage the dispensing means to move it against its bias into lubricating position during the advancing movement of the housing, and means timed with the movement of the housing for shifting the cam means, after its operation of the dispensing means, to render said cam means ineffective upon the return movement of the housing and to render said cam-means effective for the next advancing movement of the housing.

11. The subject-matter of claim 10, wherein the housing is mounted for reciprocating motion by means of a carriage having grooved traction rollers mating with spaced parallel supporting bars, and other spaced and grooved rollers positioned between said bars and mating with the same and mounted on the carriage on axes at right angles to the axes of the traction rollers.

12. In an apparatus for dispensing a lubricant, a housing mounted for reciprocal movement and adapted to be positioned to be engaged by a moving object to be lubricated, to advance the housing in one direction, biasing means acting to return the housing to reset position in the other direction of its movement, a barrel mounted within the housing for reciprocal movement substantially transverse to the movement of said housing and having its ends projecting through the housing, a dispensing nozzle fitted on one end of the barrel and adapted to engage a mating lubrication fitting on said object to be lubricated when said barrel is moved in one direction of its movement, means within the housing for biasing the barrel in the other direction of its movement to withdraw it from lubricating position, a cam-surface arranged adjacent the path of movement of said housing and positioned to engage the other end of said barrel to move the barrel against its bias into lubricating position during the advancing movement of said housing, a plunger slidably fitted within the barrel and having one end projecting beyond said housing so as to be actuated by the cam-surface to eject lubricant from the barrel through said dispensing nozzle, an inlet port in the barrel communicating its bore with a source of lubricant supply under pressure, whereby, when the barrel and plunger are actuated by the camming surface, the barrel and plunger are moved forward simultaneously to bring the dispensing nozzle into lubricating position and further movement of the actuating means forces the plunger to eject a lubricant charge from the barrel through said nozzle, and means actuated by the movement of said housing for shifting said cam-surface, after the ejecting movement of said plunger, to render said cam-surface ineffective upon the return movement of said housing to reset position and to render said cam-surface effective for the next advancing movement of said housing.

13. The subject-matter of claim 12, wherein the ejecting end of the plunger is reduced for a distance to underlie said port when said plunger is at the limit of its ejecting movement to provide a surface to be acted upon by the pressure of the lubricant delivered to the barrel through said port, whereby the plunger is returned to a reset position after each ejection movement of the plunger.

References Cited in the file of this patent

UNITED STATES PATENTS

| 2,594,039 | Le Clair | Apr. 22, 1952 |

FOREIGN PATENTS

| 20,206 | Australia | Oct. 28, 1929 |
| 357,385 | Great Britain | Sept. 24, 1931 |
| 557,792 | Great Britain | Dec. 6, 1943 |
| 710,004 | Germany | Sept. 1, 1941 |